(No Model.)　　　　　　　　　　　　　2 Sheets—Sheet 1.
J. MURPHY.
HOSE MACHINE.
No. 399,547.　　　　　　　Patented Mar. 12, 1889.
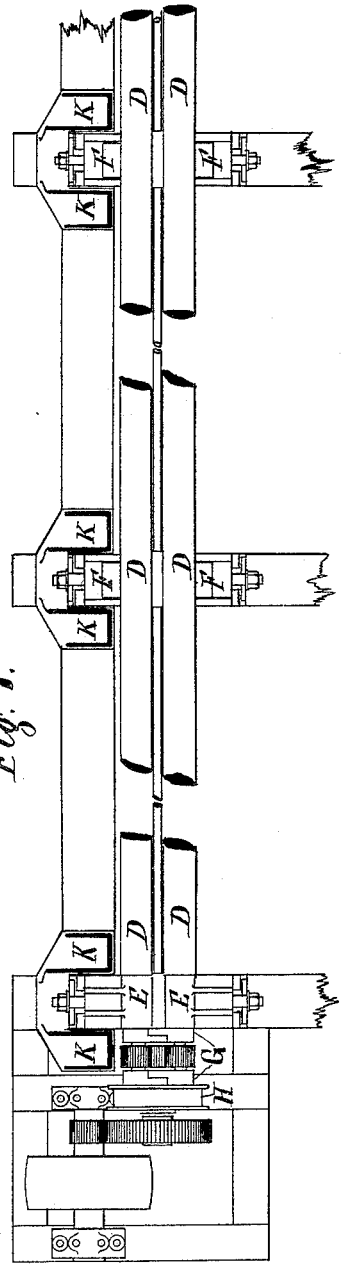
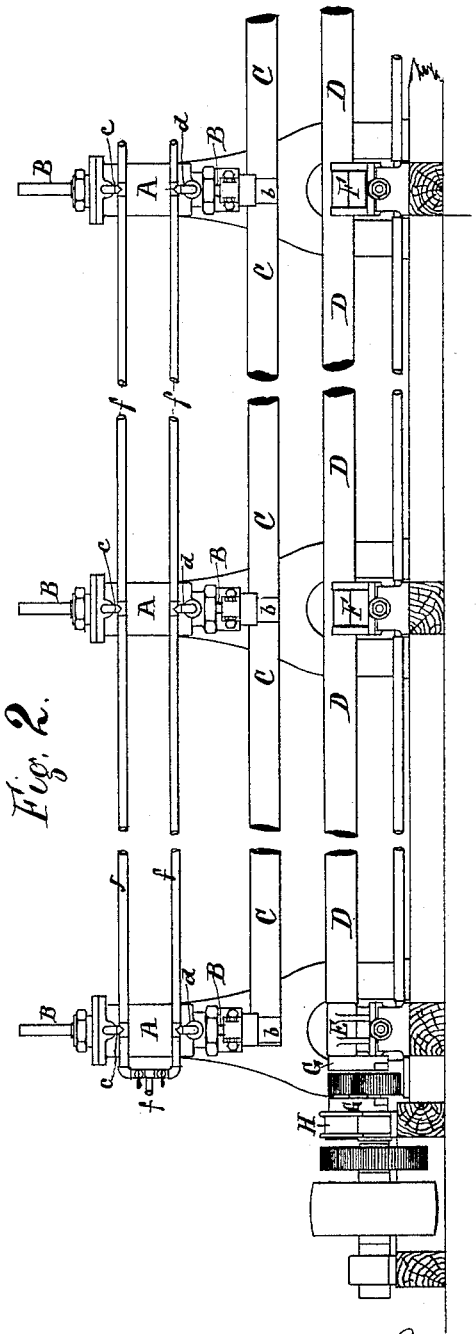
Witnesses:
Manuel Rodriguez.
C. C. Weightman
Inventor
John Murphy
by Wm H. Weightman
Atty.

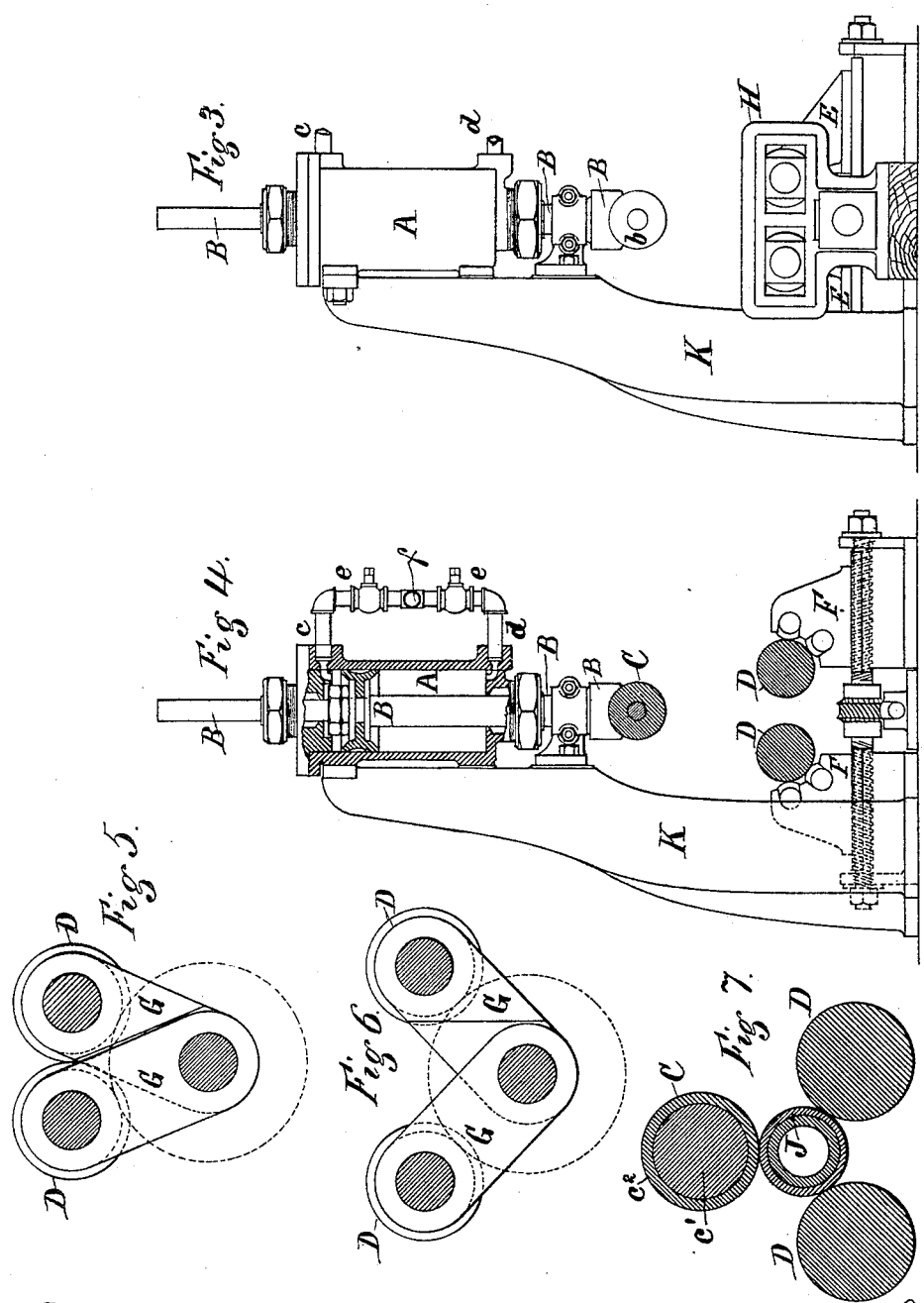

UNITED STATES PATENT OFFICE.

JOHN MURPHY, OF BROOKLYN, NEW YORK.

HOSE-MACHINE.

SPECIFICATION forming part of Letters Patent No. 399,547, dated March 12, 1889.

Application filed November 21, 1888. Serial No. 291,426. (No model.)

*To all whom it may concern:*

Be it known that I, JOHN MURPHY, a citizen of the United States, residing in Brooklyn, Kings county, and State of New York, have invented certain new and useful Improvements in Machinery for the Manufacture of Hose, of which the following is a specification, reference being had to the accompanying drawings.

My invention relates specially to the wrapping and permanently pressing together of the several layers of cloth or rubber constituting a completed hose. In the manufacture of rubber hose strips of rubber or rubber cloth are cut to a proper width, and with the edges overlapping and carefully jointed are wrapped tightly around a mandrel. It is specially essential that the several layers shall be permanently pressed to a close and lasting adhesion.

Rollers adjustable to suit all sizes of hose to be made have been used; but no adjustment as to extent or elasticity of pressure to be brought upon the material while being wrapped about the mandrel has ever been made use of; hence this improved method of effecting such controlled pressure has been applied—namely, that of using three roller-shafts set at such angles as to equalize the pressure according to size of hose, one of which rollers, preferably the upper one, consists of a central metallic mandrel having an outer annular layer of soft and elastic material or rubber adapted to impress itself into and over any irregularities caused by double thickness of material or unevenness of any kind, and, in addition to this elasticity of roller, a direct-acting cylinder-compress is used, the same being operated by means of any of the well-known means or methods using air, water, steam, and the like, whereby, pressure being brought to bear above the piston-head of such compress, any required extra pressure may be applied to the rolling of the hose, according to the necessities of the thickness and strength required in the finished hose; or, on the contrary, a delicacy and lightness of pressure may be effected to a nicety by the admission of pressure below the piston-head to take the weight of roller-shafts, piston-rods, and heads wholly or in part off from the hose while being made.

My improvements, therefore, consist in the construction, arrangement, and adaptation of the several parts or portions composing the machine in combination, as hereinafter shown and described.

In the drawings, Figures 1 and 2 represent plan and longitudinal elevation of a machine embodying my improvements. Fig. 3 represents an end elevation, showing the method of supporting, effecting, and controlling the movements of the roller-shafts. Fig. 4 represents a sectional elevation of cylinder, and showing position and movement of roller-bearings for the longer roller-shafts. Figs. 5 and 6 show the construction and operation of the supporting-links carrying the operating-gears of the roller-shafts. Fig. 7 represents a special section through the elastic-faced roller. Fig. 4 shows also a section through cylinder-compress.

The letter A designates the direct-acting cylinder-compress, any number of which may be used, according to the length of the machine or of the hose to be made.

B designates the piston heads and rods supporting the upper rollers, C.

B' designates a stop and guide for the piston and rod B, whose duties are the guidance of the piston and rod in the up-and-down movement and the stopping of the same before the piston reaches or strikes the upper head of the cylinder.

D designates the adjustable bottom roller-shafts.

E designates the end bearings for the bottom roller-shafts.

F designates the intermediate roller-bearings for the roller-shafts D.

G designates the supporting-links carrying the operating-gears for roller-shafts D. The connected ends of the several lengths forming the upper roller-shaft are supported at end *b* of piston-rod B.

*c* and *d* designate the inlet and outlet ports of the cylinders A, and *e* and *f* designate the pipes for supplying the operating medium.

H designates a slide-bearing for operating-gears.

K designates the supporting-frames for cylinders A.

In Fig. 5 the bottom or table rollers are shown quite close to each other in position for the manufacture of small hose, while in Fig. 6 they are represented as set quite far apart, the connecting and supporting links G being made of such length as to keep the gears in proper working contact at all times and under all conditions.

The roller-shaft section, as shown in Fig. 7, has a central mandrel, $c'$, surrounded by an elastic compression-face, $c^2$.

J designates the wrapped hose.

In the operation of this device pressure in the shape of air, water, or steam, and the like, is brought to bear first upon the bottom side of the several pistons B to effect the lifting of the upper roller-shaft, C, up and out of the way, while the mandrel and the material to be rolled thereon are placed between and supported by the bottom or table roller-shafts, D. With the mandrel ready for rolling, the upper roller-shaft, C, is allowed to drop to position bearing upon the mandrel by withdrawing the lifting pressure from pistons B in cylinders A. The operating-gear is then put in motion and the bottom roller-shafts caused to revolve in such direction as to roll the rubber cloth upon the mandrel to form the hose. In the meantime the weight of the upper roller-shaft, C, and the several pistons and rods is upon the rolling hose material to effect its close adhesion. Should this weight not be sufficient, additional pressure is brought to bear by the admission of compressed air, water, steam, or the like mediums, the increased pressure or weight on the rolling hose material being controlled by the greater or less admission of pressure medium. In addition to this, the upper roll being covered with a soft and elastic material, safe pressure is brought to bear everywhere upon the hose material to effect a secure adhesion independent of extra thicknesses or irregularities of surface.

What I claim as new, and desire to secure by Letters Patent, is—

1. In combination with the lower rollers of a hose-making machine, a direct-acting steam or air cylinder provided with upper and lower ports and communicating pipes and valves for the admission or discharge of the operating medium, and an upper roller supported and operated by means of a piston moved in said cylinder, substantially as and for purposes specified.

2. In combination with the lower rollers of a hose-making machine, a series of adjustable supports for said lower rollers, an upper roller, a supporting piston and rod for said upper roller, and one or more direct-acting steam or air cylinders provided with upper and lower ports, and communicating pipes and valves for the admission and discharge of the medium operating said pistons, substantially as and for purposes set forth.

3. In combination with the three rollers of a hose-making machine, any one of which is covered with an annular layer of soft and elastic material, a series of adjustable supports for the bottom rollers of said machine, a supporting piston and rod for the upper of said rollers, and one or more direct-acting steam or air cylinders provided with ports, and communicating pipes and valves for the admission of the medium operating said supporting piston and rod, substantially as and for purposes set forth.

JOHN MURPHY.

Witnesses:
WM. H. WEIGHTMAN,
JAMES MAHONY.